United States Patent [19]

Sasamoto

[11] Patent Number: 4,510,541
[45] Date of Patent: Apr. 9, 1985

[54] MAGNETIC DISK STORAGE UNIT WITH RECIPROCATING MAGNETIC HEAD FOR CLEANING THE MAGNETIC DISC

[75] Inventor: Asao Sasamoto, Odawara, Japan

[73] Assignee: Hitachi, Ltd., Tokyo, Japan

[21] Appl. No.: 381,303

[22] Filed: May 24, 1982

[30] Foreign Application Priority Data

Jun. 1, 1981 [JP] Japan .................. 56-82481

[51] Int. Cl.³ .................. G11B 5/41; G11B 5/012
[52] U.S. Cl. .................. 360/97; 360/128
[58] Field of Search .................. 360/97, 98, 99, 102, 360/103, 75, 106, 128

[56] References Cited

U.S. PATENT DOCUMENTS

| | | | |
|---|---|---|---|
| 3,885,245 | 5/1975 | Nakatani | 360/97 |
| 4,212,044 | 7/1980 | Plotto | 360/103 |
| 4,241,368 | 12/1980 | Tadokoro et al. | 360/128 |
| 4,280,157 | 7/1981 | Herman et al. | 360/97 |
| 4,371,902 | 2/1983 | Baxter et al. | 360/75 |
| 4,384,311 | 5/1983 | McNeil | 360/128 |
| 4,385,333 | 5/1983 | Hasler | 360/97 |
| 4,412,161 | 10/1983 | Cornaby | 360/75 |

*Primary Examiner*—Bernard Konick
*Assistant Examiner*—Paul Stefanski
*Attorney, Agent, or Firm*—Antonelli, Terry & Wands

[57] ABSTRACT

A magnetic disk storage unit is proposed for cleaning away dust particles on a disk by a magnetic head 7, which is in contact with the surface of the magnetic disk when a magnetic disk 3 is stationary or rotated at a low speed, and which is floated away from the surface of the magnetic disk, as the revolution rate of the magnetic disk increases.

When the magnetic disk starts to rotate or when the disk is rotating at a low speed in a continuous rotation, the magnetic head is reciprocated in the radial direction of the magnetic disk, thereby to peel off the dust particles deposited on the surface of the magnetic disk and the head with the removed dust particles then being collected by a filter.

11 Claims, 6 Drawing Figures

MAGNETIC DISK STORAGE UNIT WITH RECIPROCATING MAGNETIC HEAD FOR CLEANING THE MAGNETIC DISC

BACKGROUND OF THE INVENTION

This invention relates to magnetic disk storage units of movable head type, and particularly to a magnetic disk storage unit having a function for removing dust deposited on the magnetic disk surface and magnetic head when the unit starts to operate or is continuously operating.

The construction of a magnetic disk storage unit is shown in FIG. 1. A magnetic disk 3 for storing information thereon is fastened to a hub 4 of a spindle motor 5. A magnetic head 7 for reading information from or writing it in the magnetic disk 3 is mounted on a carriage 8 which is moved by a screw 10 of pulse motor 9 in the direction of an arrow 13. The magnetic head 7 is in contact with the surface of the magnetic disk 3 when the magnetic disk 3 is stationary, but is floated away from the surface of the magnetic disk 3 when the magnetic disk 3 starts to rotate and increases the revolution rate, that is the so-called contact start-stop (hereinafter, abbreviated CSS) system is employed. The CSS system needs no control mechanism for loading and unloading of the magnetic head to and from the magnetic disk surface, and therefore at present it is used in most of the magnetic disk storage units. FIG. 2 is a graph showing the situation in which the magnetic disk 3 rotates. In FIG. 2, the ordinate indicates the revolution rate of the magnetic disk 3, and the abscissa the time. The magnetic disk 3 is driven to rotate from a start point O and reaches a steady state of rotation, A as illustrated. The magnetic head 7 is at first not floated away from the magnetic disk surface due to the rough surface of the magnetic disk 3 and the pressing force of a plate spring 20 of the magnetic head 7 against the disk surface until the disk 3 reaches a peripheral speed of 10 m/sec. After it reaches that speed, the head 7 is floated away from the disk surface, and at the steady state of rotation, or peripheral speed of disk 40 m/sec, the head 7 is floated by 0.5 µm away from the disk surface. To stop the magnetic disk 3 from rotation, the power switch for the spindle motor 5 is turned off and a brake 6 provided is operated to stop the disk in a short time as shown by straight line B—C. If the brake 6 were not provided, the disk 3, after turning off the power switch, would follow a curve B—D as shown, so that the head 7 slides on the disk 3 for a long time.

The magnetic head 7 is aerodynamically floated by a small amount of gap above the magnetic disk 3, and the gap becomes smaller and smaller as the memory capacity increases. When the gap is in the order of sub-microns, even the dust particles in suspension in air become a problem. Thus, in order to prevent unclean air in the exterior, 18 of a disk chamber 17 from entering into the disk chamber 17, a packing 19 is used to provide a seal between the base 1 and the cover 2. The parts to be incorporated in the disk chamber 17 are rinsed and assembled in a clean room in which the amount of dust is reduced. The dust particles are flown up by CSS and are carried on an air flow 12 caused by the rotating force of the magnetic disk 3 and removed through a dust filter 11 provided at the center of the disk 3.

In such a magnetic disk storage unit, the flown up dust particles, when the magnetic disk 3 starts to rotate in sliding contact with the head 7, are floated in air, carried on the air flow 12 and collected by the dust filter 11. The air flow 12, however, is reduced in its flow rate in the period of slowing down of the disk 3 so that the dust particles are not collected by the dust filter 11, but drift in air and soon are deposited on the surface of the magnetic disk 3. FIG. 4 shows the dust particle 14 deposited on the disk surface relative to the magnetic head 7. As shown in FIG. 4, when the disk 3 starts to rotate, the magnetic head 7 is located at a position indicated by a broken line, and when the disk is in the steady state of rotation, the head 7 at a position indicated by a solid line. When the disk 3 starts to rotate, and when the dust particle 14 deposited on the disk surface is at a position where it collides with the head 7, the dust particle 14 is removed by the rotation of the disk 3. However, since the dust particle 14 is usually distributed on the entire surface of the disk 3 and therefor some dust particles are left thereon, the head 7 will often collide with the dust particle 14 when the disk 3 reaches the steady state of rotation.

Moreover, when the magnetic disk storage unit is operated continuously (in some case, for several years), the dust particles within the sealed chamber are deposited on the head to narrow the spacing between the head and the disk, and finally the head may collide with the disk.

On the other hand, the energy generated when the disk 3 is made to be in sliding contact with the head 7 is proportional to the square of the speed of the disk, as shown in FIG. 3, in which the ordinate represents the sliding energy ratio and the amount of floating of the head, and the abscissa is the peripheral speed of the disk. From FIG. 3, it will be seen that the peripheral speed of the disk is 40 m/sec at the steady state as compared with the 10 m/sec at the time the head 7 starts to float away from the disk 3. The sliding energy ratio at 40 m/sec is 16 times as large as that at 10 m/sec. Thus, at the steady state, the disk is scraped, upon collision, with such large sliding energy as mentioned and soon the recorded information is destroyed.

The magnetic disk storage unit is used for the main file in a computer system, and therefore the destruction of the information recorded in the magnetic disk storage unit will lead to the breakdown of the system, or will cause the most important problem.

SUMMARY OF THE INVENTION

It is an object of the invention to provide a magnetic disk storage unit having a function to remove dust particles deposited on the magnetic disk and head upon start of the operation of unit or during continuous operation.

The feature of this invention is that when the magnetic disk starts to rotate or when it rotates at a low speed in a continuous rotation, the magnetic head is moved in the radial direction of the magnetic disk.

DESCRIPTION OF THE PREFERRED EMBODIMENTS

Figure 1:
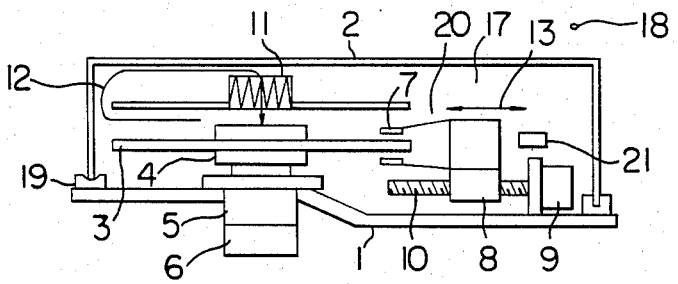
FIG. 1 shows the construction of a magnetic disk storage unit to which the present invention is applied.
Figure 2:
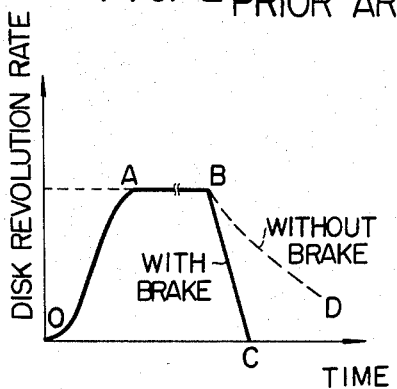
FIG. 2 is a graph showing the condition in which the magnetic disk rotates.
Figure 3:
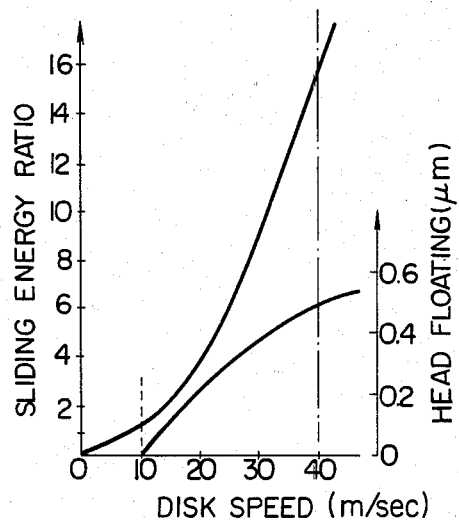
FIG. 3 is a graph showing the amount of floating of the magnetic head and the sliding energy ratio with respect to the revolution rate of the disk.
Figure 4:
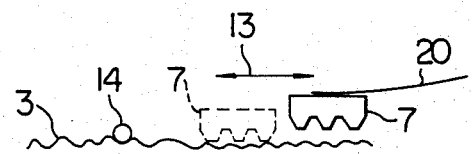
FIG. 4 is a schematic diagram showing the condition in which the head is floated.

Referring to FIG. 4, when the magnetic disk 3 starts to rotate, the magnetic head 7 is in contact with the magnetic disk 3 as indicated by the broken line. In this condition in which the disk 3 rotates with a small sliding energy, the pulse motor 9 (see FIG. 1) is operated to move the magnetic head 7 in the radial direction of the magnetic disk 3 (in the arrow-13 direction in FIG. 4) so that the magnetic head 7 slides on the whole surface of the magnetic disk 3. Therefore, the dust 14 deposited on the magnetic disk surface collides with the magnetic head 7, thereby being peeled off from the magnetic disk surface. At this time, since there may be dust which is difficult to remove, the magnetic head 7 is preferably reciprocated on the disk 3. As the revolution rate of the magnetic disk 3 increases, the magnetic head 7 is floated away from the disk surface. However, the dust on the disk can be removed as long as the distance between the magnetic disk 3 and the head 7 thereabove is smaller than the size of the particles of dust.

An embodiment of the control mechanism will hereinafter be described with reference to FIGS. 5 and 6.

Figure 6:
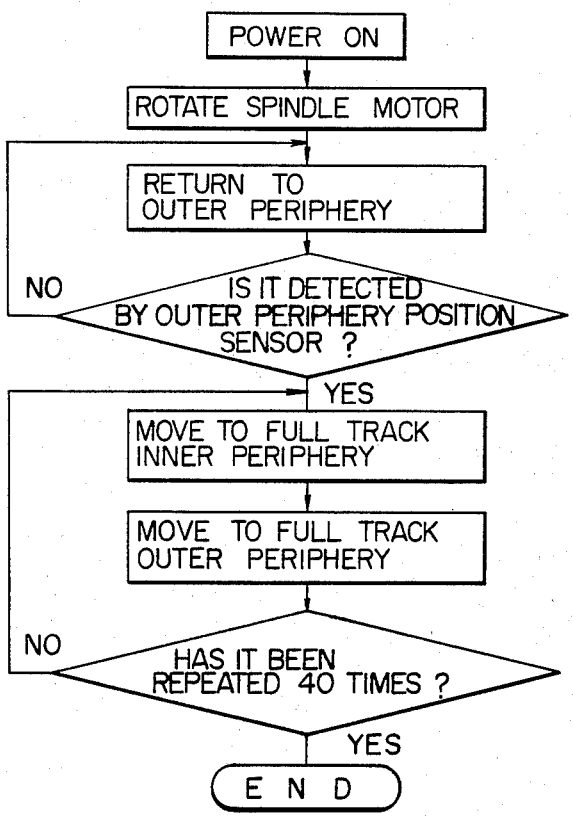
FIG. 6 is a flow chart showing the procedure for the operation control.

FIG. 6 is a block diagram of the control mechanism, and FIG. 6 is a flow chart for the control operation.

Figure 5:
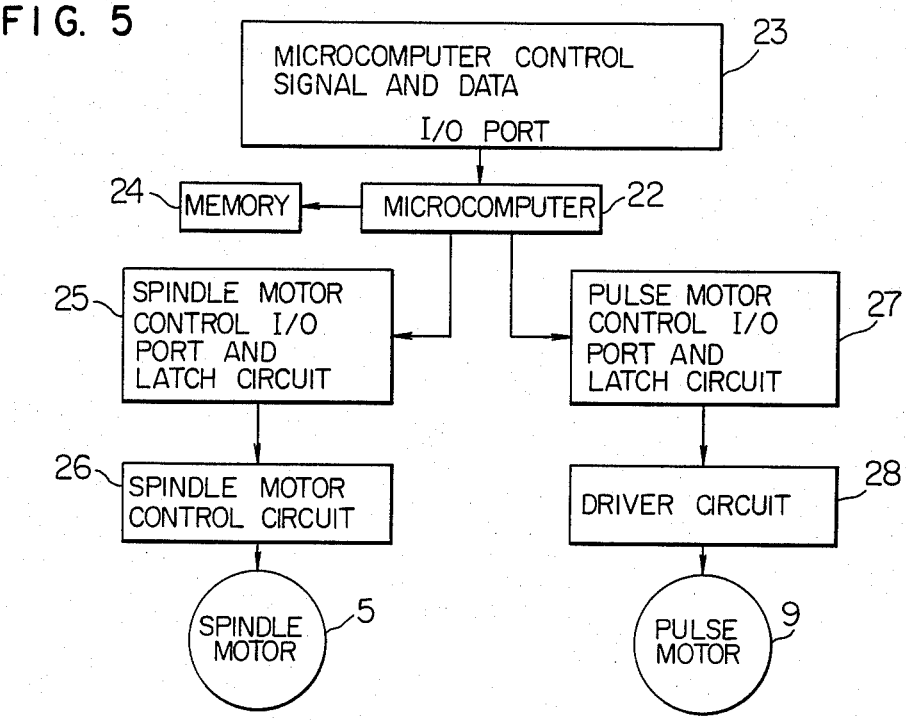
FIG. 5 is a block diagram of the control of operation according to this invention.

The spindle motor 5 for rotating the magnetic disk 3 and the pulse motor 9 for driving the carriage 8 on which the magnetic head 7 is mounted are controlled by a microcomputer 22 shown in FIG. 5. Referring to FIG. 5, a microcomputer control signal—DATA I/O port 23 receives a control signal including a start signal, data, a detected signal and the like from a host system and supplies them to the microcomputer 22. The microcomputer 22 is responsive to the control signal, data and the like from the microcomputer control signal—DATA I/O port 23 to execute the program as shown in FIG. 6. In this case, data is stored in and read out from a memory 24. The control signal and data from the microcomputer 22 are supplied to and held in a spindle motor control I/O port and latch circuit 25, and them converted to an amount of control for the spindle motor 5 by a spindle motor control circuit 26. The control signal and data from the microcomputer 22 are also supplied to and held in a pulse motor control I/O port and latch circuit 27 and then converted to a driving signal for the pulse motor by a driver circuit 28.

Referring to FIG. 6, first the power switch is turned on, and the microcomputer 22 permits the spindle motor 5 to rotate and, while it is at low speed, permits the pulse motor 9 to be operated to move the magnetic head 7. At first, it is unknown where the magnetic head 7 is positioned on the magnetic disk 3, and therefore the magnetic head 7 is moved to the outer periphery of the magnetic disk 3 by driving the pulse motor 9 until it is detected by the outer periphery position detecting sensor 21 (see FIG. 1). After being detected, the magnetic head 7 is moved toward the inner periphery, and when it reaches an inner periphery position, it is again moved back to the outer periphery position. It takes 4 to 5 seconds for the spindle motor 5 to start to rotate and for the revolution rate of the magnetic disk 3 to change from a range of small sliding energy to a range of large sliding energy, or speed of 20 m/s. It takes about 0.1 second for the magnetic head 7 to once reciprocate over the full tracks. Therefore, the magnetic head 7 can reciprocate 40 to 50 times during the time of 4 to 5 seconds. Detecting that the head 7 has reciprocated 40 to 50 times, the head 7 is stopped from moving.

By this reciprocation of the head 7 on the magnetic disk 3, all particles of dust deposited on the whole disk surface can be removed from the surface of the disk. The removed dust particles are carried by the air flow 12 (see FIG. 1) and collected by the dust filter 11.

In the case of continuous operation of the magnetic disk storage unit, a time period in which there are few demands for access to the storage unit (for example, at midnight) is selected, or periodic time intervals are set. In these cases, the revolution rate of the magnetic disk is reduced by decrease of the source voltage of the motor 5 to a low value (10 m/s–20 m/s), under which the magnetic head 7 is reciprocated in the radial direction of the magnetic disk 3 as described above. Thus, the magnetic head 7 and the magnetic disk 3 are made to be in sliding contact with each other under the condition of small sliding energy, permitting the dust particles deposited on the disk surface to be peeled off without damage to the head and the disk. The removed dust particles are carried by air flow and collected by the dust filter.

According to the invention, as described above, the dust particles deposited on the magnetic disk and the head which directly cause the collision between the magnetic disk and head can be removed upon start of operation of the storage unit or continuous operation thereof.

I claim:

1. A magnetic disk storage unit including a magnetic head and a disk for recording and reproducing information, means for controlling said magnetic head to be in contact with a surface of said magnetic disk when said magnetic disk is stationary or rotated at a low speed and to float away from the surface of said magnetic disk as the revolution rate of said magnetic disk increases, and drive control means for enabling reciprocating movement of said magnetic head in a radial direction of said magnetic disk when said magnetic disk starts to rotate, whereby dust on at least one of said magnetic disk surface and said magnetic head is removed.

2. A magnetic disk storage unit including a magnetic head and a disk for recording and reproducing information, means for controlling said magnetic head to be in contact with the surface of said magnetic disk when said magnetic disk is stationary or rotated at a low speed and to float away from the surface of said magnetic disk as the revolution rate of said magnetic disk increases, said magnetic disk storage unit comprising:

drive means for rotating said magnetic disk;

magnetic head drive means for moving said magnetic head in a radial direction of said magnetic disk; and drive control means for controlling said magnetic disk drive means and said magnetic head drive means to reciprocate said magnetic head in the radial direction of said magnetic disk when said magnetic disk starts to rotate, whereby dust on at least one of said magnetic disk surface and said magnetic head is removed.

3. A magnetic disk storage unit according to claim 2, wherein said magnetic disk, said magnetic disk drive means, said magnetic head, and said magnetic head drive means are arranged within a sealed chamber including an air-flow path provided with a dust filter.

4. A magnetic disk storage unit according to claim 2 or 3, wherein said drive control means comprises:
   a microcomputer,
   means for converting data transferred from said microcomputer to an amount of control to said drive means for said magnetic disk, and
   means for converting data transferred from said microcomputer to a drive signal to said magnetic head drive means.

5. A magnetic disk storage unit including a magnetic head and a disk for recording and reproducing information, means for controlling said magnetic head to be in contact with the surface of said magnetic disk when said magnetic disk is stationary or rotated at a low speed and to float away from the surface of said magnetic disk as the revolution rate of said magnetic disk increases, said magnetic disk comprising:
   a base;
   a spindle motor fixed to said base;
   said magnetic disk mounted on said spindle motor;
   a pulse motor secured to said base;
   a carriage engaged with a screw that is connected to said pulse motor, so as to move said head in a radial direction of said magnetic disk by said screw;
   said magnetic head being mounted on said carriage;
   a cover for forming a sealed chamber in cooperation with said base;
   a filter provided in an air-flow path within said sealed chamber; and
   drive control means for controlling said spindle motor and said pulse motor to reciprocate said magnetic head in the radial direction of said magnetic disk when said magnetic disk starts to rotate, whereby dust on at least one of said magnetic disk surface and said magnetic head is removed.

6. A magnetic disk storage unit according to any one of claims 1 to 5, wherein said magnetic head is in sliding contact with the surface of said magnetic disk during the reciprocation of said magnetic head.

7. A magnetic disk storage unit according to any one of claims 1 to 5, further comprising
   a sensor for detecting the position of said magnetic head on the surface of said magnetic disk.

8. A magnetic disk storage unit according to claim 7, wherein said drive control means controls said magnetic head drive means so that said magnetic head is first moved to the outer peripheral side of said magnetic disk during the reciprocation of said magnetic head said magnetic head is moved toward the inner peripheral side of said magnetic disk after the most outer peripheral position of the magnetic head on the surface of said magnetic disk is detected by said position detecting sensor, said drive control means thereafter controlling said magnetic head drive means to repetitively reciprocate said magnetic head between the outer and inner peripheral sides of the magnetic disk.

9. A magnetic disk storage unit according to claim 5, wherein said drive control means comprises:
   a microcomputer,
   a spindle motor control circuit for converting data transferred from said microcomputer to an amount of control to said spindle motor, and
   a driver circuit for converting data transferred from said microcomputer to a drive signal to said pulse motor.

10. A magnetic disk storage unit according to any one of claims 1, 2 and 4, wherein said drive control means enables reciprocation of said magnetic head in the radial direction of said magnetic disk under small sliding energy when said magnetic disk rotates at a speed no greater than 20 m/sec.

11. A magnetic disk storage unit according to any one of claims 1, 2 and 4, wherein said drive control means enables reciprocating movement of said magnetic head for at least a predetermined number of reciprocal movements.

* * * * *